(12) United States Patent
Mores et al.

(10) Patent No.: US 9,475,578 B2
(45) Date of Patent: Oct. 25, 2016

(54) ROTARY WING AIRCRAFT WITH A TAIL SHROUD

(71) Applicant: AIRBUS HELICOPTERS DEUTSCHLAND GMBH, Donauworth (DE)

(72) Inventors: Sebastian Mores, Munich (DE); Alessandro D'Alascio, Haar (DE); Rainer Grodau, Munich (DE); Qinyin Zhang, Augsburg (DE); Christian Wehle, Augsburg (DE); Stefan Probst, Buchdorf (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 497 days.

(21) Appl. No.: 14/563,054

(22) Filed: Dec. 8, 2014

(65) Prior Publication Data

US 2015/0158584 A1 Jun. 11, 2015

(30) Foreign Application Priority Data

Dec. 10, 2013 (EP) .................................... 13400034

(51) Int. Cl.
*B64C 27/82* (2006.01)

(52) U.S. Cl.
CPC ....... *B64C 27/82* (2013.01); *B64C 2027/8254* (2013.01); *B64C 2027/8272* (2013.01)

(58) Field of Classification Search
CPC .......... B64C 27/82; B64C 2027/8272; B64C 2027/8254
See application file for complete search history.

(56) References Cited

U.S. PATENT DOCUMENTS

| 3,750,982 A | 8/1973 | Gear |
| 4,809,931 A | 3/1989 | Mouille et al. |

(Continued)

FOREIGN PATENT DOCUMENTS

| DE | 2204619 | 9/1972 |
| EP | 0680872 | 11/1995 |

(Continued)

OTHER PUBLICATIONS

Canadian Office Action Dated Jan. 21, 2016, Application No. 2,867,682, Applicant Airbus Helicopters Deutschland GmbH, 4 Pages.

(Continued)

*Primary Examiner* — Brian M O'Hara
*Assistant Examiner* — Michael Kreiner
(74) *Attorney, Agent, or Firm* — Brooks Kushman P.C.

(57) ABSTRACT

A rotary wing aircraft with a tail rotor in a rotor duct of a shroud. A bumper projects from a lower transition region of said shroud, said lower transition region having a left hand and a right hand lower transition edge between respectively the left hand and the right hand annular surface around the rotor duct and the bumper. Upper leading edges of a vertical fin and of said shroud are provided with left hand and right hand trailing edges. A projection of the upper transition edge to an upright longitudinal plane is defined by a spline curve through points Pi (i=1 . . . 5) and a projection of the lower transition edge to the plane is defined by a spline curve through points Pi (i=6 . . . 10) defined by their respective coordinates (xi, zi) relative to a centre of the shrouded tail rotor.

9 Claims, 7 Drawing Sheets

(56) References Cited

U.S. PATENT DOCUMENTS

| | | |
|---|---|---|
| 5,102,067 A | 4/1992 | Weiner et al. |
| 5,131,604 A | 7/1992 | Yoerkie, Jr. et al. |
| 5,588,618 A | 12/1996 | Marze et al. |
| 8,286,908 B2 | 10/2012 | Kebrle et al. |
| 8,827,201 B2 | 9/2014 | Alfano |
| 2009/0014581 A1 | 1/2009 | Kebrle et al. |
| 2012/0061522 A1 | 3/2012 | Sullivan et al. |
| 2012/0138731 A1 | 6/2012 | Alfano |

FOREIGN PATENT DOCUMENTS

| | | |
|---|---|---|
| EP | 2460720 | 6/2012 |
| FR | 2600036 | 12/1987 |
| WO | 9828187 | 7/1998 |
| WO | 2014025252 | 2/2014 |

OTHER PUBLICATIONS

European Search Report for EP 13400034, Completed by the European Patent Office on May 12, 2014, 3 Pages.

Fig.9
Section C-C

ROTARY WING AIRCRAFT WITH A TAIL SHROUD

CROSS REFERENCE TO RELATED APPLICATION

This application claims priority to European patent application No. EP 13 400034.8 filed on Dec. 10, 2013, the disclosure of which is incorporated in its entirety by reference herein.

BACKGROUND OF THE INVENTION (1) Field of the Invention

The invention relates to a rotary wing aircraft, e.g. a rotary wing aircraft rotary wing aircraft with a shrouded tail rotor.

(2) Description of Related Art

A ducted tail rotor (e.g. a Fenestron®) is a rotor placed inside a tail of a rotary wing aircraft. The part of the tail containing the rotor is called shroud. The shrouded tail rotor is rotating inside a duct placed in the shroud. The shroud has a substantially toroidal geometrical shape, with the rotor rotation axis being the axis of the toroidal shape.

The shroud delays the rotor stall, if the blade tip is sufficiently close to the duct, with a blade clearance of 0.4%-1% of the shrouded tail rotor radius, thus increasing the rotor efficiency. The shroud allows the rotor induced flow to create as well regions of under-pressure on a collector side of the duct thus generating additional thrust in the same direction of the shrouded tail rotor's thrust, so that roughly half of the total anti-torque is generated by the rotor and the rest by the shroud. In forward flight condition the shrouded rotor anti-torque is at its minimum because most of the anti-torque generation function is taken over by the vertical fin mounted on top of the shroud and the bumper at its bottom.

So basically the shroud is designed for hover and sideward flight conditions, whereas in forward level-flight, descent and climb the vertical fin and the bumper produce the requested anti-torque. Numerical analysis and flight testing of known shrouds of rotary wing aircrafts highlight that any side-forces produced by these shrouds and the associated vertical stabilizing surfaces, i.e. fin and bumper in forward flight conditions are similar in value. Yet the shrouds cause significantly more drag than the vertical fins. This implies that the aerodynamic efficiency, i.e. side force over drag, of the shrouds is much poorer than that of the vertical fins.

Typically the trailing edge surface of the shroud is blunt and sharp in order to improve the rotary wing aircraft handling quality during sideward flight, e.g. lateral flight, when the rotary wing aircraft has a side slip angle beta of 90 or 270 deg. or quartering flight, when the rotary wing aircraft has beta angles of 45, 135, 315 deg. etc., thanks to the defined airflow separation on the sharp left and right edges of this trailing edge surface. Yet, since the blunt trailing edge surface is quite wide it highly contributes to the overall shroud drag during forward flight. Additionally this wide trailing edge surface is essentially perpendicular to the rotary wing aircraft mid-plane (y=0); leading to somewhat identical aerodynamic effective surfaces between left and right hand side of the shroud of the tail rotor. In other words, the x-z-projection surfaces of the left and the right hand side of the shrouds of the state of the art are identical.

Since the vertical fins are typically defined through at least one airfoil featuring high lift over drag and lift variation over angle of attack values, said vertical fins are highly effective, in contrast to the shrouds which are designed to first of all enclose the shrouded tail rotor as well as to improve the shrouded tail rotor thrust performance in hover and sideward flight by generating additional side force due to the suction effect of the shrouded tail rotor induced flow on the shroud's surface.

The document US2012/0138731 A1 describes a blunt trailing edge of a shroud of a shrouded tail rotor comprising sinusoidal protuberances in the shroud longitudinal direction and orthogonal to the H/C mid plane.

US2012/0061522 A describes a shape of an airfoil including a three dimensional wave pattern in order to improve aerodynamics as well as reducing nuisance noise.

U.S. Pat. No. 5,102,067 A describes an integrated rotary wing aircraft empennage structure with a shrouded anti-torque unit in order to improve overall H/C performance with an overall integration of the vertical and horizontal stabilizing mean into the aircraft structure.

The document U.S. Pat. No. 5,131,604 describes a rotary wing aircraft having a tail boom and an empennage structure including a shroud, a vertical stabilizer, and a horizontal stabilizer, a ducted fan anti torque device. Airflow duct surfaces have an axis and are configured for mounting internally in the shroud with said axis substantially perpendicular to the medial plane of the shroud. The airflow duct includes a divergent duct portion downstream of and contiguous to the inlet. An outlet terminates the divergent duct portion and has a curved lip configuration that includes a first constant radius lip segment, a second constant radius lip segment, and intermediate lip segments of variable radius intermediate said first and second constant radius lip segments. A support strut has an elliptical configuration and includes non-radial support strut extending non-radially with respect to the airflow duct axis.

Other prior art documents were considered while preparing the application, i.e.: DE2204619, FR2600036, EP0680872, EP2460720, U.S. Pat. Nos. 3,750,982, 4,809, 931, 5,588,618, WO9828187 and WO2014025252.

The state of the art low curvature shroud leading edges can feature unsteady flow detachment and reattachment in lateral and quartering flight of a rotary wing aircraft.

BRIEF SUMMARY OF THE INVENTION

It is an object of this invention to provide a rotary wing aircraft featuring less drag, improved flight performance and efficiency in forward flight, and featuring an improved stability in lateral and quartering flight conditions.

The solution is provided with a rotary wing aircraft with the features of claim 1 of the invention.

According to an embodiment of the invention a rotary wing aircraft comprises a fuselage and a vertical midplane in an x-z plane through said fuselage. Said fuselage has a width (wfus) in a y-direction transversal to said x-z plane between parallel left hand and right hand surfaces of the fuselage.

A main rotor is mounted on a top of said fuselage, a tail boom is mounted on a rear end of said fuselage and a tail rotor in a rotor duct of a shroud is mounted to a rear end of said tail boom. A vertical fin projects from an upper profile of said shroud essentially along the x-z plane towards the top.

A bumper projects from a lower profile of said shroud essentially along the x-z plane opposite to the top. Upper leading edges of said vertical fin and of said shroud and left hand and right hand trailing edges of said shroud are connected by an upper transition region from the shroud towards the vertical fin with a left hand and a right hand upper transition edge between respectively a left hand and a right hand annular surface around the rotor duct of the shroud and the vertical fin and are connected by a lower transition region from the shroud towards the bumper with a left hand and a right hand lower transition edge between respectively the left hand and the right hand annular surface around the rotor duct of the shroud and the bumper.

A diameter D of the rotor duct is 62%+/−30% of the fuselage's width (wfus) and a diameter dsh of the annular surface is 110%-9.8%, +10% of the diameter D. A projection of the xz upper transition edge to the x-z plane is defined by a spline curve through points Pi (i=1 . . . 5) defined by their coordinates (xi, zi) relative to a center of the shrouded tail rotor according to the following table:

| Point P | of curve | Horizontal X Distance (range of variation) | Vertical Z distance (range of variation) |
|---|---|---|---|
| 1 | 11a | x1 −1.7 D (−1; 0.7) | z1 D (−1.71; +0.5) × D |
| 2 | 11a | x2 −0.85 D (−0.15; +0.35) × D | z2 0.25 D (−0.25; +0.5) × D |
| 3 | 11a | x3 0 (±0.5 D) | z3 0.71D (−0.11; +0.29) × D |
| 4 | 11a | x4 D (−0.5; +0.4) | z4 0.4 D (−0.2; +0.3) × D |
| 5 | 11a | x5 1.7 D (−0.3; +0.7) | z5 0.1 D (±0.5 D) |

Where for all the points Pi (i=1 . . . 5) the following constraints must be fulfilled:
$x1<x2<x3<x4<x5$;
$z1 \leq z2 \leq z3$;
$z5 \leq z4 \leq z3$.

With $z2=z3=z4$ a state of the art design is obtained for the xz upper transition edge, being in this case a straight horizontal line.

When intersecting the shroud with a plane A-A at constant z2, for instance, the resulting intersection curve, belonging to the z=z2 plane is composed by curve segments obtained by intersecting the shroud left and right sides, the vertical fin leading edge and the fillet surfaces generated between respectively the left shroud and the vertical fin and the right shroud and the vertical fin. As the vertical fin is generated by at least one airfoil characterized by high curvature at a leading edge, whereas the shroud surfaces are characterized by low curvatures at least one order of magnitude smaller than at the leading edge of the airfoil, the resulting composite curve, thus the upper leading edge of the shroud, will provide the advantage of reducing drag, in high speed forward flight, and triggering a stable well-defined flow separation along the high curvature shroud upper leading edge region, in lateral and quartering flight.

The aerodynamic design of the inventive rotary wing aircraft's shroud is improved regardless if the inventive rotary wing aircraft's main rotor system rotates clock-wise or anti-clock-wise.

The shroud areas of the inventive rotary wing aircraft have the following advantages:

The duct geometry, comprising the coaxial segments: collector, cylindrical part and diffuser, has a minimal length, conditioning the shroud thickness. The shroud thickness is related to the blade chord of the tail rotor and measures 34% (−10%, +8%) of the duct diameter D. The respective spline curves for the left hand and right hand transition edges reduce the surfaces of the respective transition regions between the vertical fin and the inventive rotary wing aircraft's shroud to a minimum and reduce the shroud volume, leading to a reduced overall tail drag. The inventive rotary wing aircraft's shroud itself is aerodynamically more efficient due to its reduced surface. The aerodynamic design is further improved by surfaces of the increased surface of the vertical fin.

The upper leading edge with curvature in conjunction with the reduced thickness of the shroud is favourable in sideward flight conditions avoiding unfavourable suction effects on the shroud leeward leading edge or flow separation and consequently avoiding generation of longitudinal vortices, i.e. parallel to the shroud leading edge itself, which might be sucked into the duct of the shrouded tail rotor by the rotor induced flow. By avoiding these unfavourable suction effects or flow separation the shroud improves lateral stability of the inventive rotary wing aircraft. The upper leading edges of the shroud of the inventive rotary wing aircraft further reduce drag in cruise and reduce unfavourable large vortices during sideward and quartering flight.

According to a preferred embodiment of the invention a projection of the lower transition edge to the x-z plane is defined by a lower spline curve through points Pi (i=6 . . . 10) defined by their coordinates (xi, zi) relative to the centre of the shrouded tail rotor according to the table below:

| Point P | of curve | Horizontal X Distance (range of variation) | Vertical Z distance (range of variation) |
|---|---|---|---|
| 6 | 11b | x6 −1.7 D (−1; +0.45) × D | z6 0.5 D (±0.5 D) |
| 7 | 11b | x7 −0.75 D (−0.5; +0.25) × D | z7 0.4 D (−0.25; +0.6) × D |
| 8 | 11b | x8 0 (±0.5 D) | z8 0.7 D (±0.5 D) |
| 9 | 11b | x9 1 D (−0.5; +0.25) × D | z9 0.15 D (−0.5; +0.85) × D |
| 10 | 11b | x10 1.5 D (−0.25; +1) × D | z10 D (±0.5 D) |

Where the following constraints must be fulfilled:
$x6<x7<x8<x9<x10$;
$z8 \leq z7 \leq z6$; and
$z8 \leq z9 \leq z10$.

According to a further preferred embodiment of the invention left hand and right hand trailing edges of said shroud are provided with a trailing edge plane between said left hand and right hand trailing edges with an inclination $\alpha 3=60°+/−50°$ with regard to the vertical midplane xz. The projection of the trailing edge plane to the x-z plane is defined by a line xz-TE with an inclination $\alpha 4=25°$ (−20°, +30°) with regard to the vertical z-axis through the point P11 located at $x11=1.15$ (−0.1/+0.9)×D on the horizontal x-axis through the center of the rotor of the shrouded tail rotor.

A corner between curve xz-upper trailing edge at the point of intersection of the curve xz-upper trailing edge with the line xz-TE is smoothed by applying to the curve xz-upper trailing edge a radius of $r2_{TE}=0.3$ D (−0.25;+0.5)×D such that the curve xz-upper trailing edge ends tangential with line xz-TE. The corner between curve xz-lower trailing edge and the line xz-TE is smoothed by applying to the curve xz-lower trailing edge 11b a radius of $r1_{TE}=0.3$ D (−0.25;+0.5)×D such that the curve xz-lower trailing edge ends tangential with the line xz-TE.

The shroud of the inventive rotary wing aircraft with the truncated trailing edge plane with sharp corners between left and right side surfaces of the shroud triggers flow separation at defined positions, i.e. at the two sharp corners, during sideward flight. The shroud of the inventive rotary wing aircraft keeps any vortices at a sufficient distance from the duct of the shrouded tail rotor, so that these vortices are not sucked by the flow induced by the rotor of the shrouded tail rotor. The shroud of the inventive rotary wing aircraft reduces the overall shroud drag with sharp truncated trailing edges defining a thinner truncated trailing edge plane, inclined to the rotary wing aircraft's vertical mid plane with improved aerodynamic efficiency.

According to a further preferred embodiment of the invention the leading edge curve of said vertical fin is geometrically defined by at least one 2-dimensional airfoil, separating the vertical fin into a left fin surface and a right fin surface with in forward flight condition the left fin surface being the pressure side of the at least one 2-dimensional airfoil and the right fin surface being the suction side of the at least one 2-dimensional airfoil or vice versa depending from the main rotor's rotational direction.

According to a further preferred embodiment of the invention the left hand and the right hand upper and lower transition edges are not symmetrical with regard to the vertical midplane.

According to a further preferred embodiment of the invention said shroud is respectively provided with left hand and right hand trailing edges of sharp wavy left and right shroud trailing edge extremities with non-linear or non-constant-curvature as "sinusoidal" rectangular, oval, non-linear or triangular wave-shapes with respective wave-lengths in the range of [0.01; 0.5] times the diameter D of the shrouded tail rotor and amplitudes of 0.17 (±0.16) times the diameter D.

According to a further preferred embodiment of the invention said shroud is provided with a shroud leading edge with "sinusoidal", rectangular, oval, non-linear or triangular wave-shapes with wave-lengths in the range of [0.01;0.5] times the diameter D of the shrouded tail rotor and amplitudes of 0.17 (±0.16) times the diameter D.

According to a further preferred embodiment of the invention said shroud is canted or tilted.

The advantages of the inventive rotary wing aircraft are due to:

The upper and lower leading edges of the shroud with smaller curvature radius, which reduce the drag of the shroud, lead to improved sideward flight behaviour of the rotary wing aircraft. The sharper "wavy" leading edges disassemble the typical large vortex on the leading edge into smaller, less intense vortices which do not affect the performance of the shrouded tail rotor negatively if ingested by the rotor contrary to large vortices, which, if ingested into the duct of the shrouded tail rotor, decrease the aerodynamic performance of the shrouded tail rotor sensibly.

Additionally, these sharper leading edges of the invention avoid the unfavourable unsteady attachment and detachment of the airflow during sideward flight conditions and thus reduce jerky behavior of the inventive rotary wing aircraft, a thinner trailing edge plane and to an asymmetric x-z-projection of the left and right shroud surfaces. The thickness measured in the perpendicular direction to the rotary wing aircraft midplane of the shroud's trailing edge represents from 19% to 59% of the shroud's thickness. The thinner trailing edge plane leads to less drag and the asymmetric shroud surfaces lead to improved effectiveness of the shroud itself due to the increased side force, while said drag is reduced, reduced overall drag of the shroud in forward flight, yet without negatively affecting the function of the shroud in hover as additional thrust generator. The projection area of the shroud on the inventive rotary wing aircraft's vertical mid-plane (y=0) is decreased to less than 50%, particularly to about 43% and the projection area of the aerodynamically shaped vertical fin increased to 44% of the projection area of the vertical mid-plane (y=0) of the inventive rotary wing aircraft's empennage. This leads to an improved transition area between the shroud and the vertical fin.

a "wavy" trailing edge, producing well defined longitudinal low-intensity "streamwise" vortices, which, by interacting with longitudinal Karman vortices always present behind blunt truncated trailing edges, reduce their strength thus the energy dissipated in the wake, is obtained by changing the curvature of the shroud surface in the aft region locally, which leads to local pressure variation causing the roll-up of smaller vortices longitudinally to the rotary wing aircraft axis.

Thus, all together, the invention provides for reduced drag of vertical stabiliser surfaces, i.e. shroud, fin and bumper, hence of the inventive rotary wing aircraft, due to increased aerodynamic efficiency of the vertical stabiliser surfaces, which leads to reduction of the wetted area thus of its weight, hence of the weight of the inventive rotary wing aircraft, increased flight speed at same engine output power or decreased fuel consumption at constant speed of the inventive rotary wing aircraft.

The invention can be applied on any rotary wing aircraft featuring a of the shrouded tail rotor or Fenestron-like anti-torque unit and leads to improved handling qualities in climb, level, descent and sideward flight conditions of the inventive rotary wing aircraft. The inventive rotary wing aircraft allows higher sideward flight speeds at maximum shrouded tail rotor pitch angles (pedal stop) at increased aerodynamic efficiency of the entire empennage.

BRIEF DESCRIPTION OF THE SEVERAL VIEWS OF THE DRAWINGS

A preferred embodiment of the invention is presented by means of the following description with reference to the attached drawings.

DETAILED DESCRIPTION OF THE INVENTION

Figure 1:
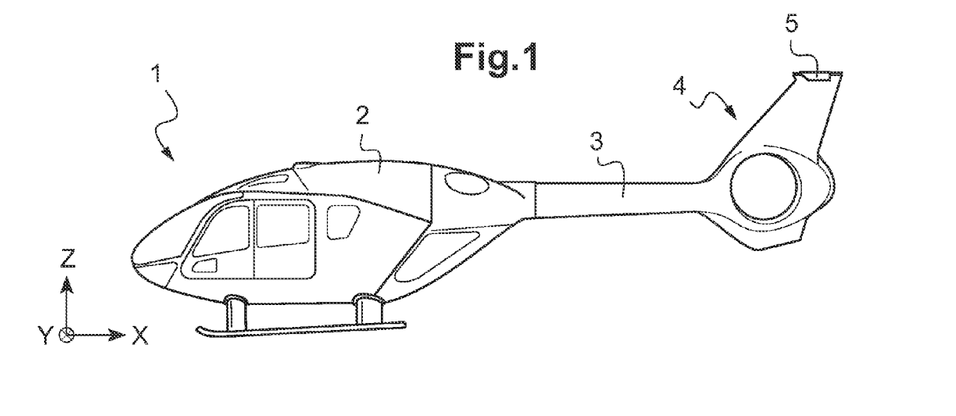
FIG. 1 shows a lateral view of a rotary wing aircraft.
Figure 2:
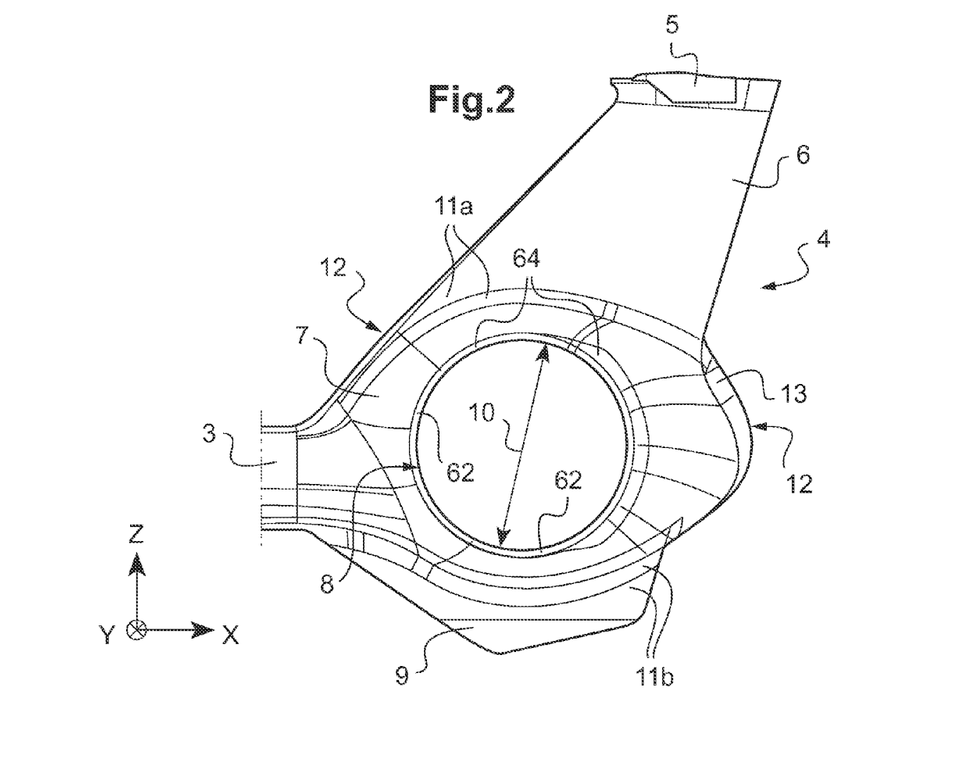
FIG. 2 shows a lateral view of an empennage according to the invention.
Figure 3:
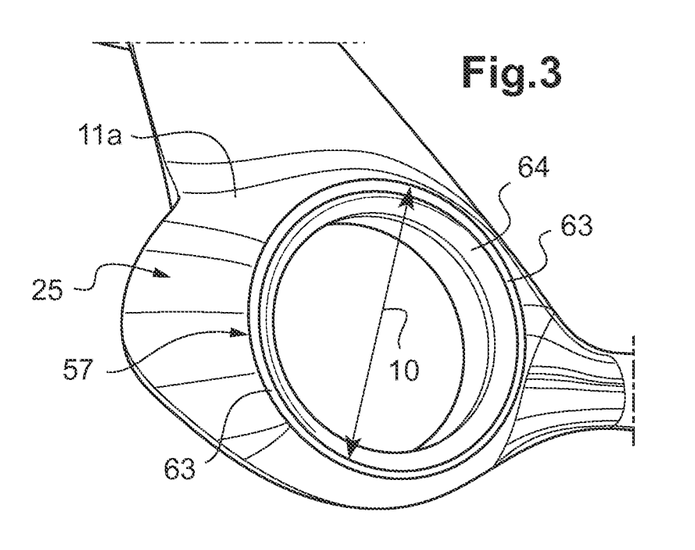
FIG. 3 shows a lateral view of an annular region adjacent to the collector of the empennage according to the invention.
Figure 4:
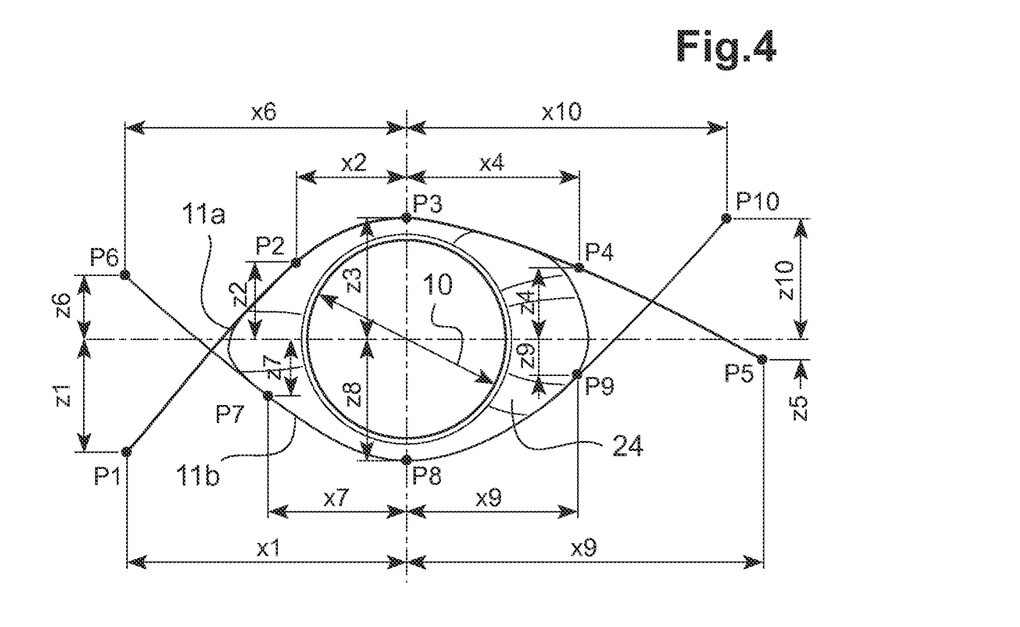
FIGS. 4 and 5 show lateral views with graphs of the shroud according to the invention.
Figure 5:
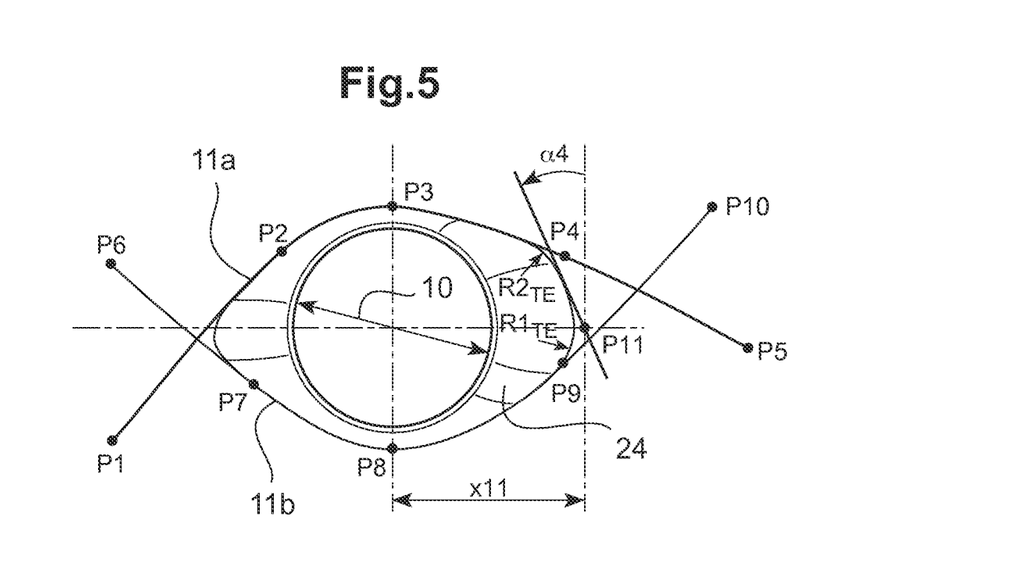

According to FIG. 1 a rotary wing aircraft 1, e.g. a helicopter comprises a fuselage 2, a tailboom 3, yaw stabilizing surfaces 4 and a pitch stabilizing mean 5. The tailboom 3 connects the yaw 4 and pitch 5 stabilizing surfaces with the fuselage 2. The yaw stabilizing surfaces 4 comprise a vertical fin 6 which is defined by lofting 2-dimensional airfoils, a rotor (not shown) of the shrouded tail rotor, a shroud 7, which includes a rotor duct 8 of the shrouded tail rotor, and a bumper 9. The duct 8 has a duct diameter D=10 measuring 62% (±30%) of the fuselage width. The fuselage width ($w_{fus}$) is defined as the maximum distance measured orthogonally to the rotary wing aircraft's vertical mid-plane between the respective outmost left hand and right hand side fuselage surfaces. The fuselage width ($w_{fus}$) is >1 m. The rotary wing aircraft's vertical mid-plane corresponds to an x-z plane. The left hand side of the fuselage 2 is directed in negative y-direction and the right hand side is directed in positive y-direction. The rotary wing aircraft 1 comprises a main rotor system (not shown) rotating clockwise or counter-clockwise—referred to the z positive direction.

According to FIGS. 2-6 corresponding features are referred to with the references of FIG. 1. A vertical fin 6 is joined to a shroud 7 of the yaw stabilizing surface 4. The shroud 7 comprises an annular surface 57 adjacent to a collector 64 of the rotor duct 8. The radial dimension $D_{sh}$ of the annular surface 57 is 110% (−9.5%;+20%) of the diameter 10. This annular surface 57, together with the collector generates Fenestron thrust from the non-rotating elements; the rest is generated of course by the rotor (not shown) of the shrouded tail rotor.

Upper portions of respective left hand/right hand surfaces 24 and 25 of the shroud 7 are between a cambered, convex upper transition edge 11a and respectively the diffusor surface 65 at its boundary curve 62 on the left hand surface 24 of the shroud 7 and the annular, essentially planar, surface 57 of the right hand surface 25 of the shroud 7. The upper transition edge 11a is convex towards the vertical fin 6.

The respective left hand/right hand upper portions of the surfaces 24 and 25 merge with a steady camber respectively with the diffusor surface 65 and the right hand annular, essentially planar, surfaces 57 and the respective left hand/right hand upper portions join the vertical fin 6 with an angle of 90°+/−20° respectively between the diffusor surface 65 on the left hand surface 24 of the shroud 7 and the annular, essentially planar, surface 57 of the right hand surface 25 of the shroud 7 and the respective left hand/right hand intersections with the vertical fin 6.

The upper transition edge 11a starts from a shroud's leading edge 12 to a left hand side trailing edge 13 and a right hand side trailing edge 17. Even though the shroud 7 is not symmetrical about its vertical mid plane and thus the transition edge 11a on the right hand side is not identical to its counterpart on the right hand side of the shroud 7, the left hand side trailing edge 13 and the right hand side trailing edge 17 are described identically for both, left and right sides.

Lower portions of the respective left hand/right hand surfaces 24 and 25 of the shroud 7 are between a cambered, convex lower transition edge 11a and respectively the diffusor surface 65 at its boundary curve 62 and the annular, essentially planar, surface 57. The lower transition edge 11b is convex towards the bumper 9. The respective left hand/right hand lower portions merge with a steady camber respectively with the diffusor surface 65 and the annular, essentially planar, surfaces 57, and the respective left hand/right hand lower portions join the bumper 9 with an angle of 90°+/−20° respectively between the diffusor surface 65, the annular surfaces 57 and the respective left hand/right hand intersections with the bumper 9.

The transition edges 11a, 11b are described by respective spline curves through 5 points: P1, P2, P3, P4 and P5. Each point Pi (with i=1 ... 5) of the upper transition edge 11a is defined by its coordinates (xi, zi). The lower transition edge 11b is defined through points P6, P7, P8, P9 and P10.

Figures 10, 11:
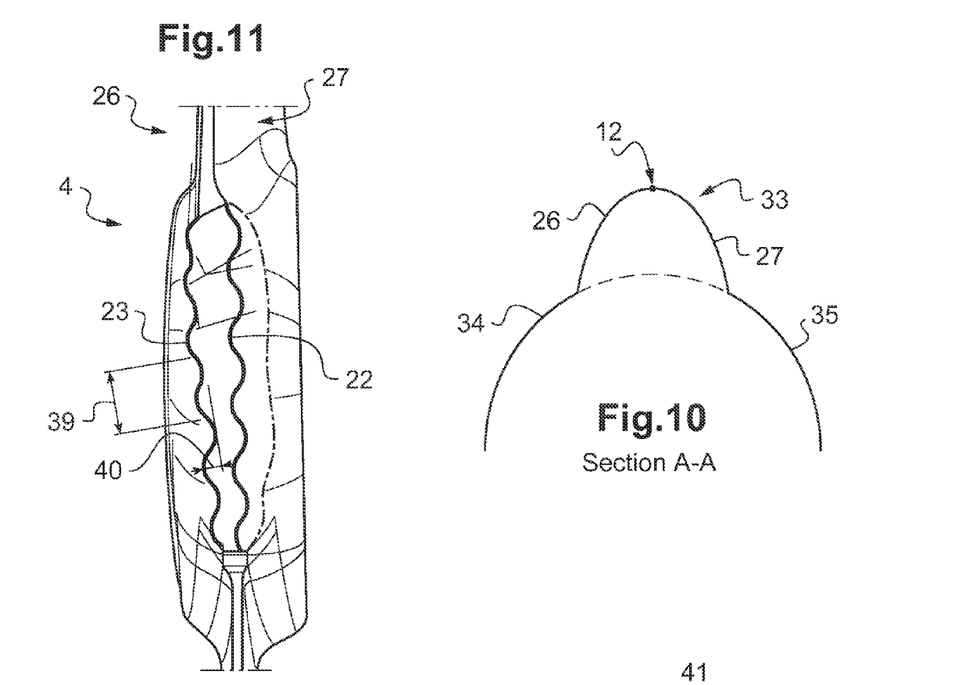
FIG. 10 shows a z=constant cut A-A through the leading edge of the shroud/fin according to the invention.
FIG. 11 shows a rear view of a wavy shroud trailing edge according to the invention.

The xi- and zi-coordinates of each point Pi are referred to the Fenestron-Rotor centre according to FIG. 11. The measures of the xi- and zi-coordinates of each point Pi and possible ranges of variation in parenthesis are given in the table below:

| Point P | of curve | | Horizontal X Distance (range of variation) | | Vertical Z distance (range of variation) |
|---|---|---|---|---|---|
| 1 | 11a | x1 | −1.7 D (−1; 0.7) | z1 | D (−1.71; +0.5) × D |
| 2 | 11a | x2 | −0.85 D (−0.15; +0.35) × D | z2 | 0.25 D (−0.25; +0.5) × D |
| 3 | 11a | x3 | 0 (±0.5 D) | z3 | 0.71D (−0.11; +0.29) × D |
| 4 | 11a | x4 | D (−0.5; +0.4) | z4 | 0.4 D (−0.2; +0.3) × D |
| 5 | 11a | x5 | 1.7 D (−0.3; +0.7) | z5 | 0.1 D (±0.5 D) |
| 6 | 11b | x6 | −1.7 D (−1; +0.45) × D | z6 | 0.5 D (±0.5 D) |
| 7 | 11b | x7 | −0.75 D (−0.5; +0.25) × D | z7 | 0.4 D (−0.25; +0.6) × D |
| 8 | 11b | x8 | 0 (±0.5 D) | z8 | 0.7 D (±0.5 D) |
| 9 | 11b | x9 | 1 D (−0.5; +0.25) × D | z9 | 0.15 D (−0.5; +0.85) × D |
| 10 | 11b | x10 | 1.5 D (−0.25; +1) × D | z10 | D (±0.5 D) |

For all the points Pi the following constraints must be fulfilled:

x1<x2<x3<x4<x5;
z1≤z2≤z3;
z5≤z4≤z3
x6<x7<x8<x9<x10;
z8≤z7≤z6; and
z8≤z9≤z10.

In order to reduce the empennage drag and to improve the directional stability of rotary wing aircraft 1 the x-z-projection surface of the portion of the shroud 7 comprised between the bumper 9 and the vertical fin 6 is reduced by 15% (±10%) according to the reduction of the projection area of the shroud 7 previously described by defining the vertical fin 6 and shroud junction, while the x-z-projection surface of the bumper 9 is kept essentially unchanged.

An angle α4=25° (−20°, +30°) is defined with regard to the vertical z-axis by a line xz-TE through a point P11 located at x11=1.15 (−0.1/+0.9)×D on the horizontal x-axis through the fenestron rotor centre. A corner R2TE between the upper trailing edge 11a and the inclined line xz-TE is smoothed via a radius of r2TE=0.3 D (−0.25;+0.5)×D, and the corner R1TE between the lower trailing edge 11b and the line xz-TE is smoothed via a radius of r1TE=0.3 D (−0.25; +0.5)×D.

The shroud 7 has a trailing edge surface 18 smoothly merging respectively with the line xz-TE and with the radius of r2TE with the upper trailing edge 11a at the corner R2TE. The trailing edge surface 18 further smoothly merges with the radius r1TE with the lower trailing edge 11b at the corner R2TE. The left hand side trailing edge 13 and the right hand side trailing edge 17 of a trailing edge surface 18 at a rear end of the shroud 7 are generally defined as aerodynamically "sharp" corners, i.e. corners with small radii of 5 mm±4 mm, sharp edges, to separate the airflow at latest along these left hand side trailing edge 13 and right hand side trailing edge 17 during typical forward or sideward flight conditions of the rotary wing aircraft 1. The entire trailing edge surface of the yaw stabilizing surfaces 4 with the vertical fin 6, shroud 7 and bumper 9 comprises the trailing edge plane 19 of the vertical fin 6, the trailing edge surface 18 of the shroud 7 and the trailing edge plane 20 of the bumper 9.

Figures 6, 7:
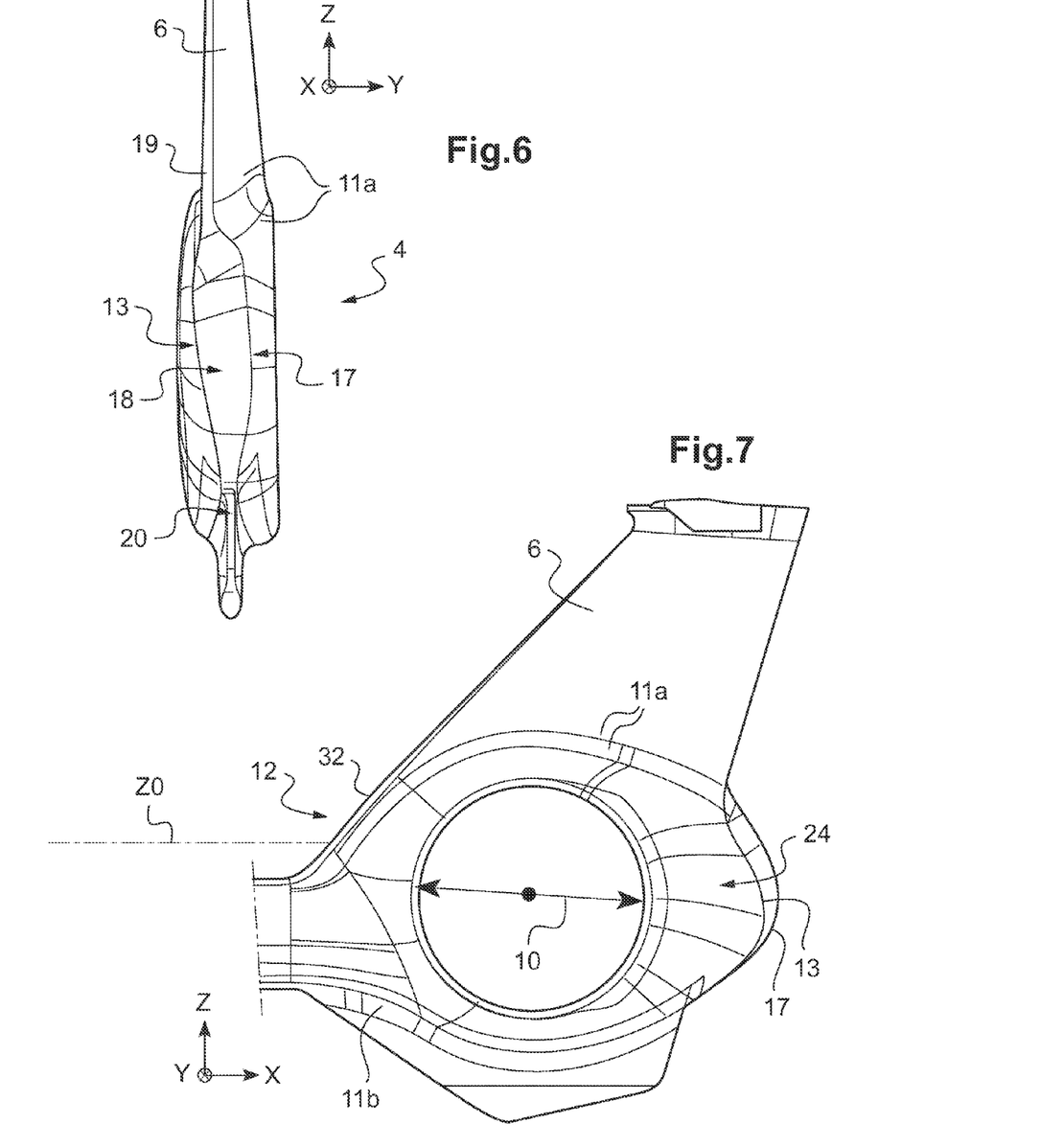
FIG. 6 shows a rear view of the empennage according to the invention.
FIG. 7 shows a lateral view of the empennage according to the invention.
Figure 8:
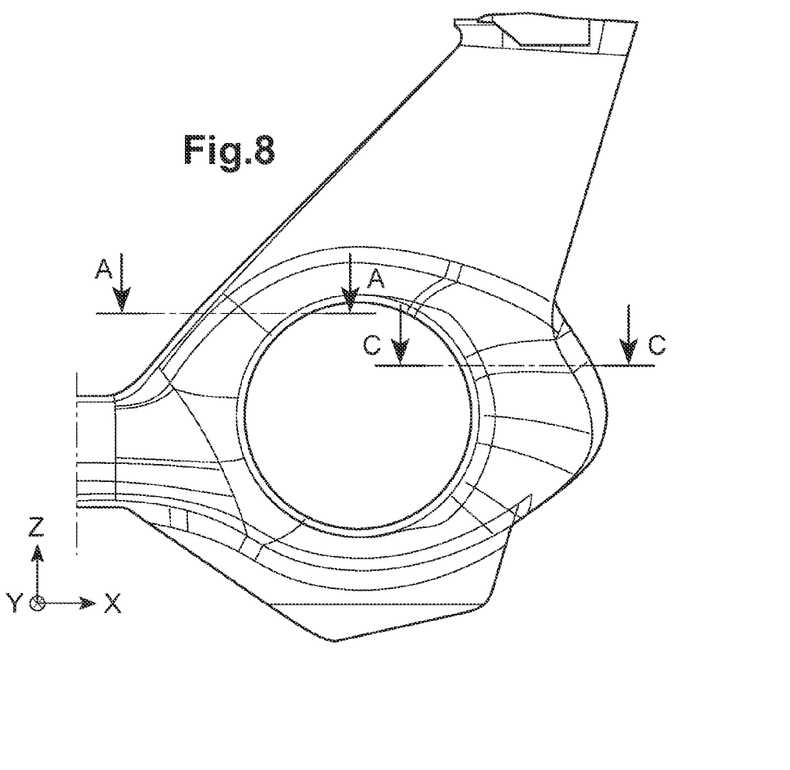
FIG. 8 shows a further lateral view of the empennage according to the invention.
Figure 9:
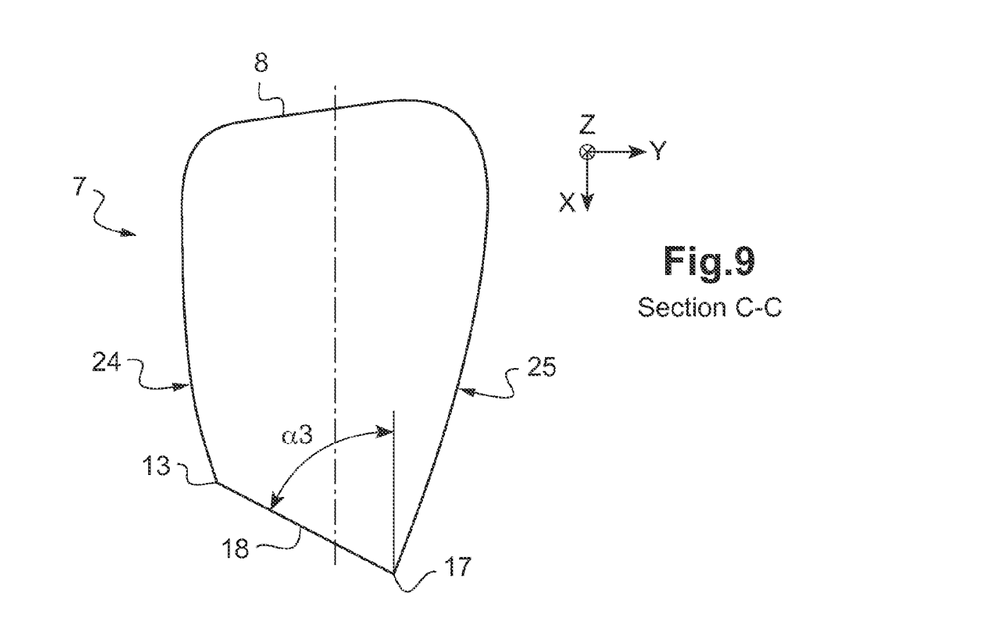
FIG. 9 shows a cross-sectional view through a rear part of the empennage according to the invention.

According to FIGS. 7, 8 and 9 corresponding features are referred to with the references of FIGS. 1-6. A plane through the line xz-TE is inclined about the same line by an angle α3 of 60° (±50°) referring to the vertical mid plane. The inclined plane provides the increased right hand side suction surface 25 of the shroud 7 and an almost constant pressure region left hand side surface 24 leading to an increased aerodynamic efficiency of the shroud 7. The x-z-projection surface of the right hand side suction surface 25 of the shroud 7 is 10% (−9%;+10%) larger than the x-z projection surface of the left hand side suction surface 24 or vice versa for rotary wing aircrafts 1 with an anti-torque force for an opposite rotation direction of the main rotor blades. The minimal distance of one of the trailing edges 13, 17 from the center of the rotor duct 8 is defined by the radius R2=0.9 (±0.25) times the duct diameter 10 at the conjunction between the rear trailing edge plane 19 of the vertical fin 6 and the rear trailing edges 13 and/or 17 of the shroud 7.

According to FIG. 10 corresponding features are referred to with the references of FIG. 1-9. The vertical fin 6 is geometrically defined by at least one 2-dimensional airfoil 33 (see FIG. 13) comprising a to a point reduced projection of the leading edge curve 12, which separates the vertical fin 6 into a left fin surface 26 and a right fin surface 27. In forward flight condition the left fin surface 26 is the pressure side of the airfoil 33 while the right fin surface 27 is the suction side of the airfoil 33 for a main rotor operating anti-clockwise for an observer looking onto the main rotor from the top. This can also be inverted for rotary wing aircrafts 1 with an anti-torque force for an opposite rotation direction of the main rotor blades. The shroud 7 includes the upper leading edge 12 which separates the shroud 7 into a left shroud surface 24 and a right shroud surface 25.

According to FIG. 11 corresponding features are referred to with the references of FIG. 1-10. Left hand and right hand trailing edges 23, 22 of the yaw stabilizing surfaces 4 are morphed into a wave form from the original trailing edges 13, 17 on the trailing edge surface 18. "Sinusoidal waves", rectangular, triangular, oval or other wave-shapes can be used, with wave-lengths 39 in the range of [0.01; 0.5] times the diameter D, 10 and an amplitude 40 of 0.17 (±0.16) times the Fenestron diameter D, 10.

Figure 12:
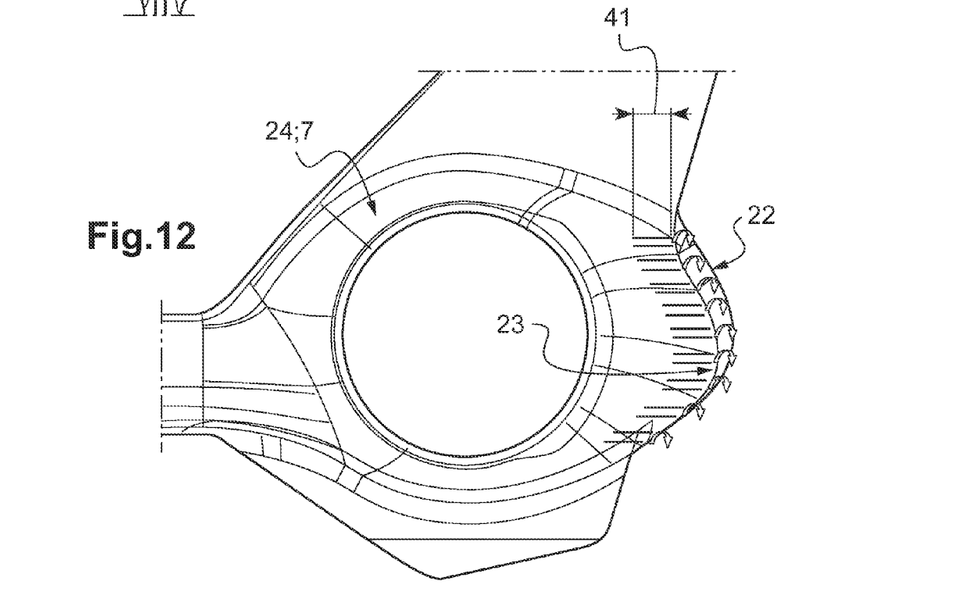
FIG. 12 shows a lateral view of the wavy shroud trailing edge according to the invention.

According to FIG. 12 corresponding features are referred to with the references of FIG. 1-11. The extension of the sharp "wavy" shroud 7 and the sharp "wavy" left and right trailing edges 22, 23 into the shroud surface is integral with a depth 41 respectively until first and second curves 62 (see FIG. 2) and 63 (see FIG. 3), the second curve 63 defining the boundary between the annular ring 57 around the collector 64 and the right shroud surface 25, and the first curve 62 defining the boundary between diffuser and the left shroud surface 24. The orientation of such extension 41 must not be horizontal or linear.

Figure 13:
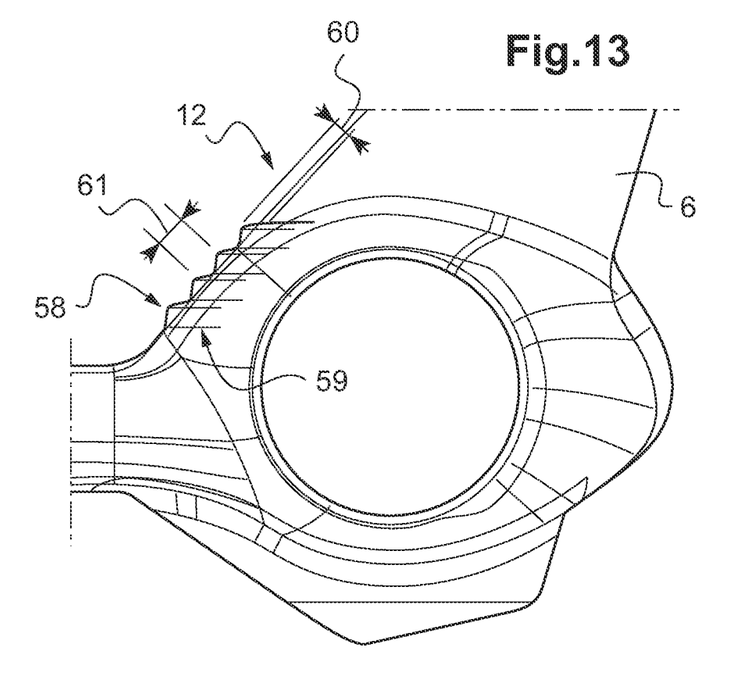
FIG. 13 shows a lateral view of an alternative wavy shroud leading edge.

According to FIG. 13 corresponding features are referred to with the references of FIGS. 1-12. Similar to the "sinusoidal wave" trailing edges 22 and 23, "sinusoidal wave" shroud leading edges 58 on the leading edge curve 12 of the vertical fin 6 are introduced above and next to the tailboom 3 in order to produce small defined vortices directed along the free stream direction for drag reduction and lateral stability improvement. The shroud leading edges 58 are sinusoidal, rectangular, oval, non-linear, triangular or provided with other wave-shapes with a wave-length 61 in the range of [0.01;0.5] times the diameter 10 and an amplitude 60 of 0.17 (±0.16) times the diameter 10. The extension of the "sinusoidal wave" shroud leading edges 58 into the shroud surface is integral with a depth 59 extending from the waved leading edge curve 58 until the first and second curves 62 and 63 respectively on the left and right shroud surfaces 24, 25. The orientation of the extension 59 must not be horizontal or linear.

REFERENCE LIST

1. Rotary wing flying machine (rotor blades not shown)
2. Fuselage
3. Tailboom
4. Yaw stabilizing mean
5. Pitch stabilizing mean
6. Vertical fin
7. rotor shroud
8. rotor duct
9. Bumper
10. rotor duct diameter D
11a. upper transition edge
11b. lower transition edge
12 Shroud and vertical fin leading edge curve
13 Left hand shroud trailing edge
17 Right hand shroud trailing edge
18 trailing edge surface
19 Fin trailing edge plane
20 Bumper trailing edge plane
22 Right modified shroud trailing edge
23 Left modified shroud trailing edge
24 Left shroud surface
25 Right shroud surface
26 Left fin surface
27 Right fin surface
33 Airfoil (fin)
34 Section cut of shroud top left side (pressure side)
35 Section cut of shroud top right side (suction side)
39 Wave-length
40 Wave-amplitude
41 Depth
57 Annular Ring
58 Waved shroud leading edge curve
59 Leading edge wave extension
60 Leading edge wave amplitude
61 Leading edge wave length
62 Boundary curve between diffuser and left shroud surface 24
63 Boundary curve between annular ring 57 and right shroud surface 25
64 Shroud collector
65 Shroud diffusor
Z = 0 = horizontal (x-y) plane
α3 = inclination angle of the shrouds trailing edge surface 18 with respect to the midplane
α4 = inclination angle of the shrouds trailing edge surface 18 with respect to the y-z-plane.

What is claimed is:
1. A rotary wing aircraft with
a fuselage and a vertical midplane in an x-z plane through said fuselage, said fuselage having a width $(w_{fus}) > 1$ m in a y-direction transversal to said x-z plane between parallel left hand and right hand surfaces of the fuselage, a main rotor mounted on top of said fuselage, a tail boom mounted on a rear end of said fuselage, a tail rotor in a rotor duct of a shroud mounted to a rear end of said tail boom, a vertical fin projecting from an upper transition region of said shroud essentially along the x-z plane towards the top, said upper transition region having a left hand and a right hand upper transition edge between respectively a left hand and a right hand annular surface around the rotor duct of the shroud and the vertical fin, a bumper projecting from a lower transition region of said shroud essentially along the x-z plane opposite to the top, said lower transition region having a left hand and a right hand lower transition edge between respectively the left hand and the right hand annular surface around the rotor duct of the shroud and the bumper, and upper leading edges of said vertical fin and of said shroud and left hand and right hand trailing edges of said shroud, wherein a diameter D of the rotor duct is 62%+/−30% of the fuselage's width ($w_{fus}$), a radial dimension $D_{sh}$ of the annular surface is 110% with tolerances of −9.5% to +20% of the diameter D, a projection of the upper transition edge to the x-z plane is defined by a spline curve through points Pi (i=1 . . . 5) defined by their coordinates (xi, zi) relative to a Fenestron-Rotor's centre according to the following table:

| Point P | of curve | Horizontal X Distance (range of variation) | Vertical Z distance (range of variation) |
|---|---|---|---|
| 1 | 11a | x1 −1.7 D (−1; 0.7) | z1 D (−1.71; +0.5) × D |
| 2 | 11a | x2 −0.85 D (−0.15; +0.35) × D | z2 0.25 D (−0.25; +0.5) × D |
| 3 | 11a | x3 0 (±0.5 D) | z3 0.71D (−0.11; +0.29) × D |
| 4 | 11a | x4 D (−0.5; +0.4) | z4 0.4 D (−0.2; +0.3) × D |
| 5 | 11a | x5 1.7 D (−0.3; +0.7) | z5 0.1 D (±0.5 D) | where for all the points Pi (i=1 . . . 5) the following constraints must be fulfilled:

x1<x2<x3<x4<x5;

z1≤z2≤z3; and z5≤z4≤z3.

2. The rotary wing aircraft according to claim 1, wherein a projection of the left hand and right hand lower transition edges to the x-z plane is defined by a lower spline curve through points Pi (i=6 . . . 10) defined by their coordinates (xi, zi) relative to the Fenestron-Rotor's centre according to the table below:

| Point P | of curve | Horizontal X Distance (range of variation) | Vertical Z distance (range of variation) |
|---|---|---|---|
| 6 | 11b | x6 −1.7 D (−1; +0.45) × D | z6 0.5 D (±0.5 D) |
| 7 | 11b | x7 −0.75 D (−0.5; +0.25) × D | z7 0.4 D (−0.25; +0.6) × D |
| 8 | 11b | x8 0 (±0.5 D) | z8 0.7 D (±0.5 D) |
| 9 | 11b | x9 1 D (−0.5; +0.25) × D | z9 0.15 D (−0.5; +0.85) × D |
| 10 | 11b | x10 1.5 D (−0.25; +1) × D | z10 D (±0.5 D) | where the following constraints must be fulfilled:

x6<x7<x8<x9<x10;

z8≤z7≤z6; and z8≤z9≤z10.

3. The rotary wing aircraft according to claim 1, wherein left hand and right hand trailing edges of said shroud have sharp corners and a trailing edge surface between said left hand and right hand trailing edges has an inclination α3=60°+/−50° with regard to the vertical midplane, the minimal extension R2 of the shroud's left and right hand trailing edges from the duct rotor's center being the radius R2 of 0.9 (±0.25) times the duct diameter D at a conjunction to a rear trailing edge of the vertical fin.

4. The rotary wing aircraft according to claim 1, wherein the leading edge curve of said vertical fin is geometrically defined by at least one 2-dimensional airfoil and separating the vertical fin into a left fin surface and a right fin surface with an in forward flight condition, the left fin surface being the pressure side of the at least one 2-dimensional airfoil and the right fin surface being the suction side of the at least one 2-dimensional airfoil or vice versa depending from the main rotor's rotational direction.

5. The rotary wing aircraft according to claim 1, wherein the left hand and the right hand upper and lower transition edges are not symmetrical with regard to the vertical midplane.

6. The rotary wing aircraft according to claim 1, wherein said shroud is respectively provided with sharp wavy left and right shroud trailing edges with non-linear or non-constant-curvature, such as "sinusoidal" rectangular, oval, non-linear or triangular wave-shapes with respective wavelengths in the range of [0.01;0.5] times a diameter D of the shrouded tail rotor and amplitudes of 0.17 (±0.16) times the diameter D.

7. The rotary wing aircraft according to claim 1, wherein said shroud is provided with a shroud leading edge with "sinusoidal", rectangular, oval, non-linear or triangular wave-shapes with wave-lengths in the range of [0.01; 0.5] times the diameter D and amplitudes of 0.17 (±0.16) times the diameter D.

8. The rotary wing aircraft according to claim 1, wherein said shroud is canted or tilted.

9. The rotary wing aircraft according to claim 1, wherein a line (xz-TE) inclined with an angle α4=25° (−20°, +30°) with regard to the vertical z-axis and through a point located at x11=1.15 (−0.1/+0.9)×D lies on the horizontal x-axis through a center of the shrouded tail rotor and is by a corner ($R_{2TE}$) between the upper trailing edge (11a) and the inclined line (xz-TE) smoothed via a radius of $r2_{TE}$=0.3 D (−0.25;+0.5)×D and further by a corner ($R_{1TE}$) between the lower trailing edge and the inclined line (xz-TE) smoothed via a radius of $r1_{TE}$=0.3 D (−0.25;+0.5)×D, to smoothly merge the trailing edge surface (18) of the shroud with the line (xz-TE) and with the upper trailing edge and with the lower trailing edge.

\* \* \* \* \*